June 9, 1931. J. LEDWINKA 1,809,592
AUTOMOBILE DOOR CONSTRUCTION
Filed Jan. 13, 1927
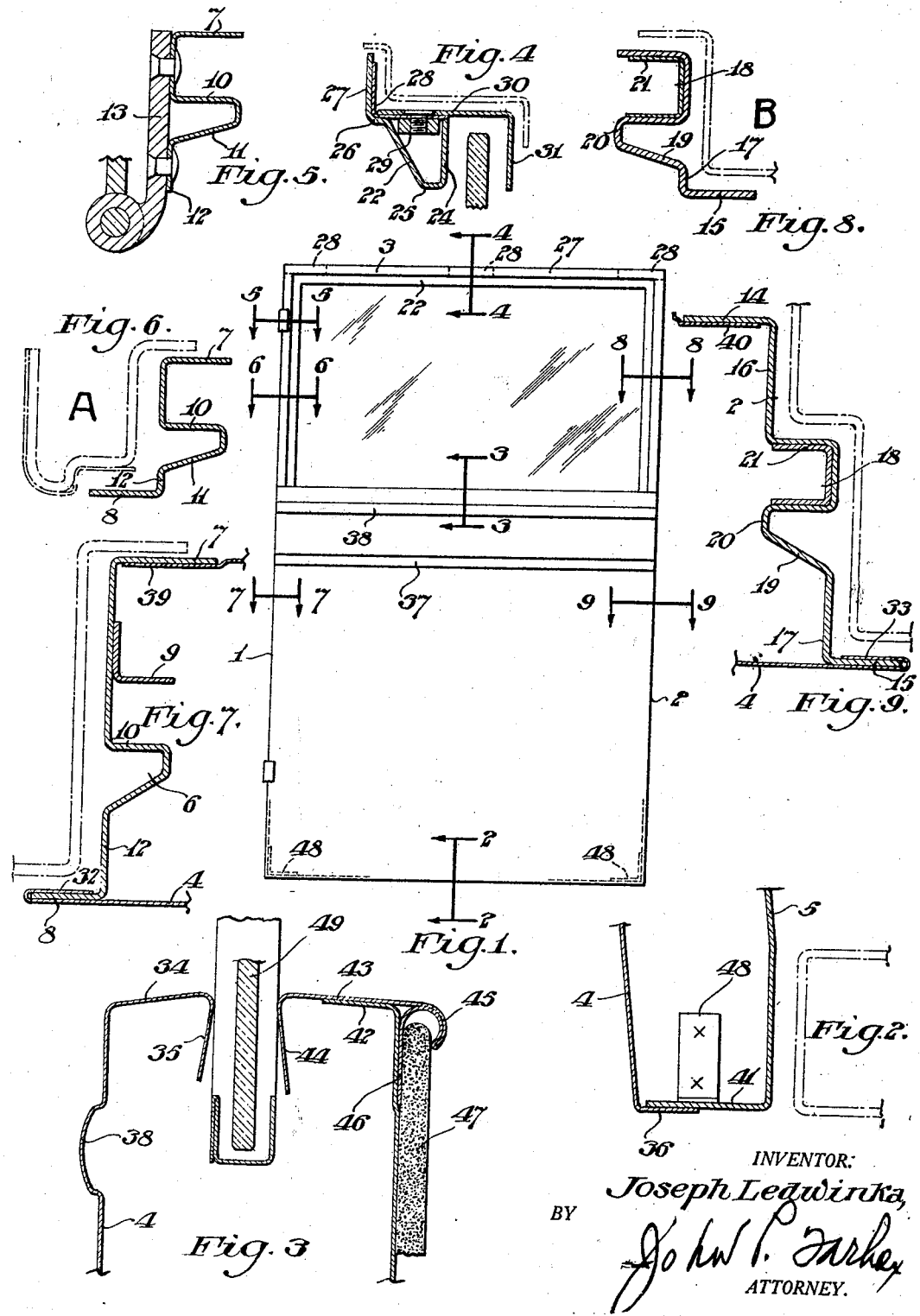
INVENTOR:
Joseph Ledwinka,
BY
ATTORNEY.

Patented June 9, 1931

1,809,592

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

AUTOMOBILE DOOR CONSTRUCTION

Application filed January 13, 1927. Serial No. 160,867.

This invention relates to an automobile door construction, being more particularly directed to a door construction for closed automobile bodies.

The usual doors found upon closed automobile bodies have a slidable window associated therewith and arranged when in its lowered position to be within a pocket or well in the lower portion of the door. In order to increase the range of the driver's vision the vertical frame members of the door should be as narrow as is possible consistent with strength. Also in designing such doors, considerations of ease of production, lightness of weight, and appearance should be carefully considered.

The principal object of this invention is to provide a door for closed automobile bodies so constructed as to afford a maximum of vision from the interior of the body, a maximum of strength for a minimum cross section of the structural elements thereof, and designed to be readily produced by simple stamping operations.

Additional objects and advantages will appear from time to time as the description progresses.

An embodiment of the invention is illustrated in the accompanying drawings, wherein Figure 1 shows the door in elevation, while Figs. 2 to 9, inclusive, are sectional views of portions thereof taken on the corresponding section lines of Fig. 1.

The door shown in the embodiment is formed of pressed metal and is primarily intended to be used upon closed automobile bodies correspondingly formed. However, it is well within the purview of the invention to use this form of door upon composite or other types of automobile bodies.

In general, the door comprises a hinge rail 1, a jamb rail 2, a top rail 3, an outer door panel 4, and an inner door panel 5. The hinge and jamb rails may be suitably bowed so as to conform to the vertical contour of the body, and the top rail may, likewise, be curved according to the longitudinal curve of the body. The hinge and jamb rails are of greater breadth from the bottom of the door to the belt line thereof than they are above such point. This arrangement is necessary in order to provide for a window well or pocket in the lower portion of the door and enables the bowed contour of the door to be so formed that the thickest section of the door is substantially its middle portion.

As shown in Fig. 7, the hinge rail in its lower section comprises a stamping of substantially Z-shape, the main arm or web of which is provided with an inwardly offset portion 6. This offset portion forms an indentation in the hinge rail taking approximately the form of the letter V, and having a straight side, an inclined side and a connecting or base portion.

The inwardly projecting arm 7 of the hinge rail is arranged on the inside of the door, while the outwardly projecting arm 8 is arranged on the exterior of the door.

Suitably spaced from the inwardly offset portion 6, is an angle bracket 9 secured to the rail by welding or other suitable means. This bracket in conjunction with the straight edge 10 of the offset, forms a guide for the slidable window of the door. The hinge rail 1 above the belt line of the door varies at different points. As shown in the section taken on line 6—6, the inclined portion 11 of the inward offset 6 is connected to the arm 8 by connecting portion 12 of considerably less length than the same portion at the point shown in Fig. 7. The rail at the point where section 5—5 is taken does not have the arm 8, the same being cut away for the accommodation of the upper door hinge 13. Similarly, the lower door hinge would be arranged at a point in the rail where the arm 8 has been cut away.

The jamb rail of the door comprises an inwardly extending arm 14 on the inner side of the door and an outwardly extending arm 15 on the outer side of the door. These arms are connected by transversely extending portions 16 and 17, the former of which has a substantially U-shaped offset 18 upon its end, while the latter of which is offset inwardly at 19 then forwardly at 20 so as to connect with the U-shaped portion 18.

It is apparent that the U-shaped portion provides a window guide channel for the lower part of the door, and that this channel is in alignment with the channel formed by edge 10 and angle 9 on the hinge rail of the door.

If it is desired, an additional or reinforcing window guide channel 21 may be welded or otherwise secured within the U-shaped portion of the jamb rail and also on the hinge rail. The jamb rail above the belt line of the door takes the configuration shown in Fig. 8, consisting of, as is evident, the U-shaped portion 18, portions 19 and 20, together with the portion 17 (of diminished length) between the part 19 and arm 15.

The door posts of the body are indicated by the phantom lines shown in the various figures, and disclose the relative cooperative relationship between the same and the door rails.

The top rail of the door comprises, in the main, a substantially V shaped portion having an inclined side 22, a vertical side 24, and a connecting part 25. The inclined side has its upper end offset outwardly at 26 and then extending vertically upward forms the arm 27. Located at each end and the middle of the top rail, are angle members 28, which are secured to the arm 27, offset 26, and extend across and are secured to the top of the vertical side 24. These angle members preferably are secured by spot welding in position, although they may also be otherwise connected thereto.

The members 28 are backed at suitable points by tapped blocks 29 welded thereto. An upper retaining strip for the window glass in the form of an angle member having a horizontal arm 30 and a vertical arm 31 is coextensive with the top rail and is secured thereto by countersunk screws in the arm 30 passing through the member 28 and threading into the tapped blocks 29. There is thus formed an adequate retaining element at the top of the door for the window glass which is readily removable for the replacement of said glass.

It should be noted, at this point in the description, that the jamb and hinge rails narrow down above the belt line of the door to a width substantially less than half of the width thereof below such point.

The top rail is secured to the top of the jamb and hinge rails, respectively, preferably by a gas welded joint, these joints being backed up and strengthened by the members 28 arranged at these points.

The outer door paneling 4 has its vertical edges 32 and 33 flanged inwardly and rearwardly around the arms 8 and 15 of the hinge and jamb rails, respectively. These flanges, together with the outer arms of the rails, form the outer overlap for the door along its vertical edges, while the arm 27 of the top rail provides the overlap at the top of the door. The outer panel extends upwardly to the belt line of the door where it is flanged inwardly at 34 and then downwardly and outwardly at 35. The lower edge of the outer panel is inwardly flanged at 36, this flange coacting with a flange on the inner panel in a manner to be hereinafter mentioned. In order to provide additional strength to the panel and to have the exterior of the door conform to the exterior of the body, outwardly bowed beads 37 and 38 may be provided in the outer panel adjacent the belt line of the door.

The inner panel 5 has its vertical edges 39 and 40 extending inside of and secured to the inner arms 7 and 14 of the hinge and jamb rails, respectively. The lower edge of the inner panel is inwardly flanged at 41 so as to overlap the inwardly extending flange 36 of the outer panel, the two flanges being welded together along the overlap. The upper edge of the inner panel is on a line with the upper edge of the outer panel, this point being approximately at the belt line of the door. The panel is inwardly flanged at 42 along this edge thus imparting strength to the panel. A separate trim element of substantially downwardly presenting channel form having its base portion 43 bearing upon and secured to the flange 42 extends along the upper edge of the inner panel. This member has a downwardly and rearwardly extending channel side flange 44 along its inner edge, while its outer edge is curved downwardly and backwardly upon itself to form a beading 45. The member then extends downwardly through side flange 46 where it is secured to the inner panel. Upholstery 47 may be secured to the inner panel, the upper edge of which would extend within the beading 45.

At the lower corners of the door, angle brackets 48 are secured to the hinge and jamb rails and to the flange 41 of the inner panel, thus providing a real strengthening element at such points.

A slidable window 49 is arranged in the door for movement in the guide channels of the rails as previously set forth. The inwardly extending flange 34 of the outer panel and the separate member 43 secured to the inner panel are so spaced apart, that the window may pass therebetween and yet the window frame is engaged thereby and held against rattle.

The description herein set forth is deemed sufficient to make the many advantages of the construction readily apparent. The inward offset provided in the hinge rail, besides forming a portion of the window guide channel on this side of the door, materially strengthens the structure. The formation of the jamb rail with the outward and inward offsets effects even greater benefit since these elements provide the door rabbet and the window guide channel, besides greatly adding to the strength of the door. It should also be noted especially, that the manner in which the rails are formed enables their cross section to be reduced to a minimum above the belt line of the door, thereby allowing a maximum of vision from within the body. Furthermore, the rails are of such shape that it is unnecessary to extend the paneling above the belt line of the door in order to complete the appearance thereof. The construction is advantageous from a production view point, inasmuch as all the elements may be formed by simple die stamping operations from sheet metal. The inner and outer panels connect the rails into an integral structure and the elements of the door are materially reduced. The arrangement of the top rail and retaining strip secured detachably thereto provides a simple and expeditious manner of inserting or removing from the door the glass window pane. While there are other distinguishing and advantageous characteristics present in the door described, those above set forth clearly indicate some of the more important ones. The claims herewith appended are drawn with the understanding that their scope is the only limitation upon the number and form of the modifications and variations which the invention may take.

What I claim as new and useful is:

1. An automobile door having a slidable window arranged therein comprising a substantially Z shaped side rail formed of an integral stamping and having an inwardly directed offset in one of its arms, another of the arms of said rail forming, with an arm of said offset, a guide channel for the slidable window, the outer face of the rail outside of the window guiding arm of the offset forming the finish molding of the door independently of outer paneling.

2. An automobile door having a slidable window arranged therein comprising a door rail stamping at a side of the window opening having a transversely extending jamb face portion and an outer door overlap portion, said transverse portion being formed with a hollow rib offset from said overlap portion of the depth of the glass run channel and forming a side wall thereof and also having its outer surface contoured to provide finish moulding for the door at the window opening independently of outer paneling.

3. An automobile door having a slidable window arranged therein comprising an upwardly presenting channel top rail provided with an upwardly projecting flange on one of its arms forming the upper overlap of the door, and an angle member detachably connected to the top rail and forming therewith a downwardly presenting channel for receiving the upper edge of the window in its raised position.

4. An automobile door having a slidable window arranged therein comprising an upwardly presenting channel top rail having an upwardly extending flange on one of its arms forming the upper overlap of the door, a member lying against and secured to said flange and extending across the top rail, and secured thereto, and an angle member detachably connected to said last named member and forming with said top rail a downwardly presenting channel for receiving the upper edge of the window in its raised position.

5. An automobile door comprising a metal stamping secured to the top of the inner door panel and formed with a curved portion having its end backwardly flanged upon itself adapted to furnish a pocket for receiving the upholstery and a beading for the inner trim.

6. An automobile door having an inner panel and a separate element secured to the top thereof, said element comprising a metal stamping extending inwardly beyond the panel and downwardly curved and backwardly flanged upon itself, the backwardly curved portion being extended downwardly against the panel and secured thereto, whereby a pocket for the top edge of the upholstery and an inner finish beading for the door is provided.

7. An automobile door having a slidable window arranged therein, comprising a window rail having a door overlap portion and a transversely extending jamb face portion, the transversely extending portion being formed inwardly of its joinder with the door overlap portion with an inwardly directed offset of substantially channel section offset from said overlap portion, the outer side wall and bottom of the channel being contoured to provide finish molding, and the inner side wall forming a side of a glass run channel.

8. An automobile door having a slidable window arranged therein comprising a substantially Z-shaped side rail formed of an integral stamping and having an inwardly directed offset in one of its arms, another of the arms of the rail forming, with an arm of said offset, a guide channel for the slidable window, and a reinforcing channel member nested within said guide channel in the rail.

9. An automobile door having a window opening therein comprising an inner panel having a transversely extending flange at the bottom of said opening, and a sheet metal finish strip of downwardly presenting channel form seated through its bottom wall on said flange and secured thereto, said finish strip extending downwardly and being secured along a wall of the channel to said panel.

10. An automobile door having a window opening therein comprising an inner panel having a transversely extending flange at the bottom of said opening, and a sheet metal finish strip of downwardly presenting channel form secured mouth down to said panel with its bottom wall seated on said panel flange, the inner portion of said finish strip being provided with a downwardly open beading formed at the juncture of the inside and bottom walls of the channel.

In testimony whereof he hereunto affixes his signature.

JOSEPH LEDWINKA.